United States Patent [19]

Williams

[11] Patent Number: 4,554,747

[45] Date of Patent: Nov. 26, 1985

[54] CONVEX RADIUS GAUGE

[76] Inventor: Robert G. Williams, Rte. 6, Box 206, Sedalia, Mo. 65301

[21] Appl. No.: 703,190

[22] Filed: Feb. 19, 1985

[51] Int. Cl.$^4$ .............................................. G01B 5/20
[52] U.S. Cl. ...................................... 33/553; 33/536; 33/172 R
[58] Field of Search ................ 33/550, 554, 553, 556, 33/535, 536, 546, 172 R, 169 R, 172 B

[56] References Cited

U.S. PATENT DOCUMENTS

| | | | |
|---|---|---|---|
| 447,276 | 2/1891 | Brayton | 33/172 R |
| 1,032,739 | 7/1912 | Caswell | 33/172 R |
| 1,516,420 | 11/1924 | Comeau | 33/191 |
| 2,066,699 | 1/1937 | Skelton | 33/172 R |
| 2,733,035 | 1/1956 | Rocheleau | 33/172 R |
| 2,796,671 | 6/1957 | Aller | 33/178 R |
| 2,949,675 | 8/1960 | McElhose | 33/178 R |
| 3,190,008 | 6/1965 | Weiss | 33/161 |
| 3,217,418 | 11/1965 | Wennerberg | 33/172 R |
| 3,492,737 | 2/1970 | Swanson | 33/161 |
| 4,326,336 | 4/1982 | Hreha | 33/178 R |

Primary Examiner—Willis Little
Attorney, Agent, or Firm—Schmidt, Johnson, Hovey & Williams

[57] ABSTRACT

A gauge in the nature of a hand tool determines the radius of a rounded corner disposed between two flat side surfaces on a workpiece. As the gauge is placed in a position to straddle the workpiece, a pair of spaced, perpendicular stops on the gauge engage the flat surfaces of the workpiece to align the latter relative to the gauge. The device also includes a bar which is shiftable along a line bisecting the angle between the flat stops, and an axially shiftable arm is pivotally mounted on one end of the bar. A dial indicator having a work contactor is secured to one end of the arm, and as the work contactor is moved to slidingly traverse the convex surface of the workpiece, the indicator reveals whether the pivotal axis of the work contactor coincides with the center of curvature of the convex surface. Both the arm and the bar are shifted until the pivotal axis coincides with the center of curvature, whereupon the radius of the convex surface may be readily measured by means of a depth micrometer.

14 Claims, 6 Drawing Figures

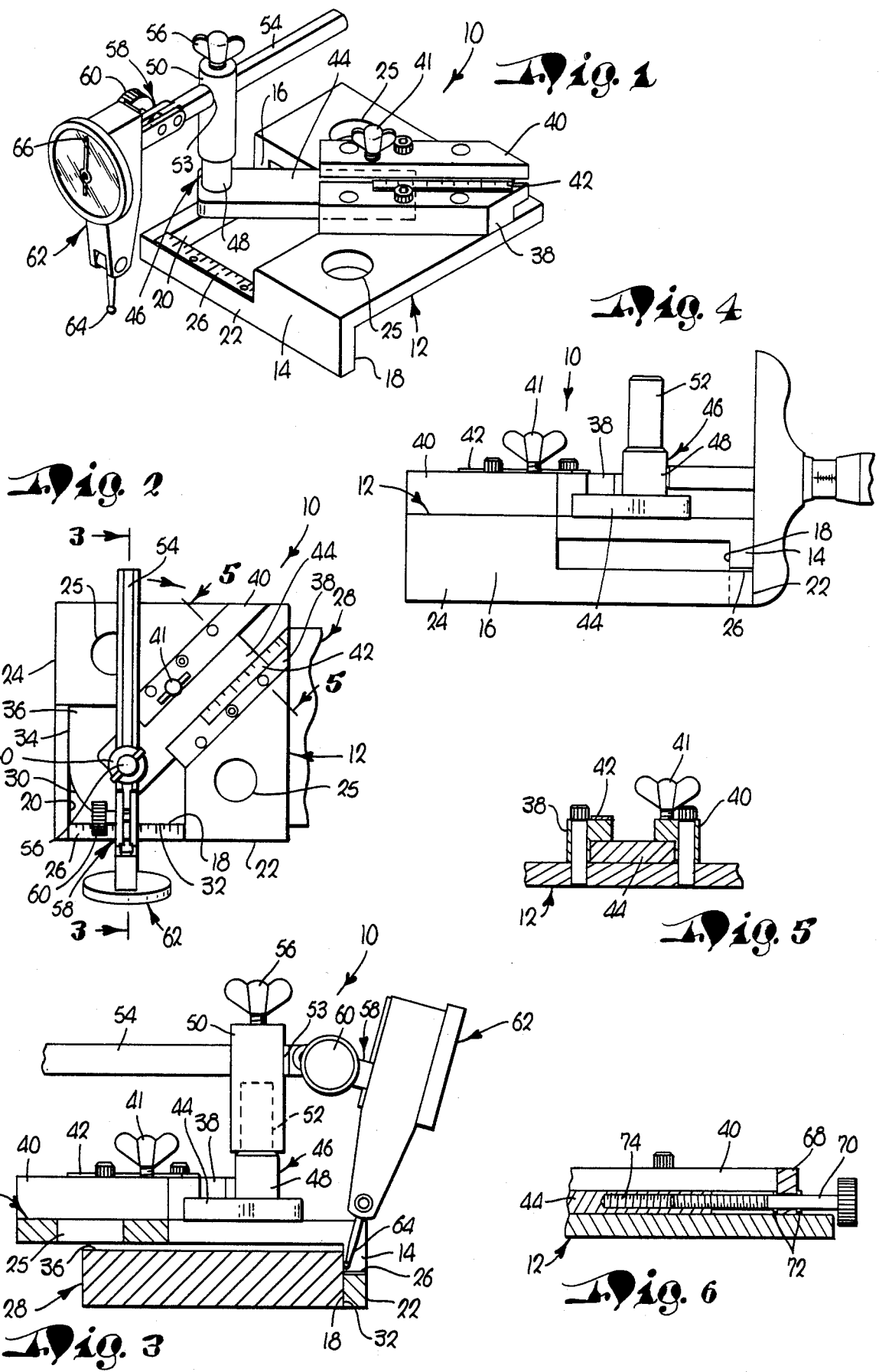

CONVEX RADIUS GAUGE

BACKGROUND OF THE INVENTION

1. Field of the Invention

This invention relates to a hand tool for determining the radius of a rounded corner on a workpiece.

2. Description of the Prior Art

Very few means are available today for assessing the radius of a convex surface on a workpiece. Such a measurement is of extreme importance, for example, during rebuilding when it is necessary to precisely match a curved surface with an identical surface on a new part. Such rebuilding is commonly undertaken when constructing a tool and die set so that the stampings produced from the new die set dimensionally conform to the stampings made by the old die set.

In the past, the radius of a convex surface has typically been obtained by use of a set of precision ground, sheet metal radius gauges. The radius is determined, through trial and error, by placing each of the curved gauges against the curved surface until a gauge is found that visually fits the surface and best precludes the passage of light between the gauge and the workpiece. Unfortunately, such sheet metal gauges are very expensive. Furthermore, the gauges by necessity are available only in discrete increments and thus the exact radius of the workpiece surface, when not identical to one of the gauges, cannot be found.

As an alternative to the commercially available sheet metal radius gauges, the machinist may opt to fabricate a curved template, again using a trial and error technique, until a finished template is produced that provides a close, visual fit to the workpiece. However, such a technique is necessarily time consuming and the finished template is useless for subsequent determinations involving different radii. Furthermore, no practical means exist for quickly checking the accuracy of the final determination.

Several devices have been proposed in the past for gauging a radius of curvature. For example, U.S. Pat. No. 3,217,418 to Wennerberg discloses a device which determines the radius of curvature on an article wherein the location of the centers of such curvatures are known from a blueprint or other design information. Unfortunately, such information is often not available to the machinist when constructing new parts to match the old parts.

In U.S. Pat. No. 2,796,671 to Aller, a radius gauging device has a swingable arm which is movable to contact an internal, concave surface of a bearing ring race. The arm is also shiftable to a point wherein the pivot axis and the curvature center coincide, such that the radius of curvature can apparently be determined. However, the device is not suitable for determining the radius of a convex surface and the device cannot be used on a workpiece that does not have a generally circular outer surface.

SUMMARY OF THE INVENTION

The present invention overcomes the disadvantages of the prior art in a simple yet highly effective fashion. The apparatus as disclosed herein is useful for determining the radius of a convex surface on a workpiece wherein the curved surface is a rounded corner or junction between a pair of non-parallel, flat surfaces.

In more detail, the apparatus comprises a hand tool which may be placed in a straddling orientation about the rounded corner of the workpiece. The apparatus has a pair of mutually perpendicular flat stops which are engageable with the flat surfaces on the workpiece adjacent the rounded corner. The radius gauge also includes a dial indicator having a work contactor, and an adjustable coupling means and a shiftable member support the dial indicator for movement of the work contactor along an arcuate path.

Once the apparatus is situated on the workpiece, the coupling means and the member are adjusted such that the work contactor slidingly traverses the convex surface during movement of the contactor along its path. If the dial indicator shows no significant fluctuation during movement of the contactor, then it is known that the pivotal axis of movement of the contactor coincides with the center of curvature of the convex surface of the workpiece, whereupon the exact radius of the surface may readily be determined by measuring the distance between the pivotal axis and the stops.

In preferred forms, a set of indicia are secured to the apparatus such that an approximate radius of the convex surface can be quickly determined by reference to the index mark directly adjacent the point of radius break or intersection between the convex surface and the flat surface on the workpiece. A second set of indicia associated with the shiftable member is then utilized to determine the location of the member. The two sets of indicia provide a means for quickly adjusting the apparatus such that the final, exact adjustment of the member and the coupling means may be determined thereafter with a minimum of trials.

As a result, the invention comprises an easily usable device which can conveniently and accurately measure the exact radius of a curved surface, in contrast to the incremental set of sheet metal radius gauges heretofore in common use. Furthermore, the apparatus is highly useful for checking defects in a machined workpiece, as deviations from circularity will be readily apparent by reference to the dial indicator. Thus, the apparatus of the instant invention advances the art to a degree heretofore unrecognized.

BRIEF DESCRIPTION OF THE DRAWINGS

FIG. 1 is a perspective view of the apparatus of the instant invention illustrating the support, the stops, the shiftable bar, the swingable arm and the dial indicator;

FIG. 2 is a plan view of the apparatus shown in FIG. 1 as the apparatus is placed into position over a part of a workpiece;

FIG. 3 is an enlarged, side sectional view taken along line 3—3 of FIG. 2;

FIG. 4 is a side elevational view similar to FIG. 3 illustrating the use of a depth micrometer to measure the radius when the arm and dial indicator are removed from the apparatus;

FIG. 5 is an enlarged, fragmentary, side sectional view taken along line 5—5 of FIG. 2; and FIG. 6 is an enlarged, fragmentary view of an alternate form of the invention depicting the adjusting screw for positioning the bar.

DETAILED DESCRIPTION

The apparatus or convex radius gauge 10 includes a flat, L-shaped, normally horizontal support or top plate 12 which is integrally connected to a pair of upright stops 14, 16. Each of the stops 14, 16 has an inner flat surface 18, 20 respectively and an outer flat surface 22, 24 respectively. The surfaces 18, 20 are both perpendicular to the surfaces 22, 24, and all of the surfaces 18–24 are perpendicular to the top surface of the support 12. A first set of indicia 26 is connected to a recessed portion of the stop 14.

As best seen in FIG. 2, a workpiece 28 has a convex surface 30 which is a junction between a pair of non-parallel, flat surfaces 32, 34 wherein the convex surface 30 and the flat surfaces 32, 34 are perpendicular to a common plane, the latter of which is parallel to a top surface 36 on the workpiece 28. The flat surfaces 32, 34 of the workpiece 28 are engageable with the flat surfaces 18, 20 respectively of the stops 14, 16 respectively for aligning the workpiece 28 relative to the support 12.

A pair of holes 25, 25 is disposed in the top plate 12 and each is operable to support a shouldered, cylindrical magnet (not shown). Advantageously, the magnet when positioned within one of the holes 25 has a lower surface disposed a slight distance above the lower surface of the plate 12 such that the magnet is operable to yieldably bias the workpiece 28 in a fixed position.

A pair of elongated, spaced, transversely L-shaped guides 38, 40 are secured to the top of the support 12, and a second set of indicia 42 is secured to the guide 38 along the length of the latter. An elongated member or bar 44 is slidably received within the cavity between the guides 38, 40 such that the bar 44 is selectively movable along a line bisecting the angle between the flat inner surfaces 18, 20 of the stops 14, 16 respectively. A wing screw 41 threadedly engages the guide 40 for protrusion through the latter to selectively affix the bar 44 at any one of a number of positions.

A normally upright, cylindrical rod 46 is secured to the bar 44 adjacent one end of the latter, and the rod 46 has a longitudinal axis that is parallel to the flat surfaces 18, 20. As best seen in FIG. 4, the rod 46 has an enlarged lower portion 48 which preferably has a radius equal to the thickness of the stops 14, 16.

Referring to FIG. 3, a cylindrical sleeve 50 is rotatably carried by a reduced diameter upper portion 52 of the rod 46, and the sleeve 50 has a transverse opening 53 which slidably receives a normally horizontal, elongated arm 54. A wing bolt 56 is threaded into the upper end of sleeve 50 for engagement with arm 54 to releasably hold the same in any one of a number of extended positions.

As best seen in FIG. 1, a clamp 58 having a tightening screw 60 is secured to one end of the arm 54 to releasably carry a tool or dial indicator 62 of conventional construction. The indicator 62 has a swingable work contactor 64, the relative position of which is indicated by means of a needle 66.

As should now be obvious to one skilled in the art, the arm 54 and the sleeve 50 provide a means for coupling the dial indicator 62 to the shiftable bar 44, and the coupling means are operable to pivotally move the work contactor 64 of the dial indicator 62 about an axis parallel to the flat surfaces 18, 20 of the stops 14, 16 respectively. The pivotal axis of movement of the work contactor 64 coincides with the longitudinal axis of the rod 46 and thereby intersects with the 45° line bisecting the angle between the stops 14, 16. Furthermore, the coupling means includes the wing screw 56 which is operable to adjustably fix the radius of the path swept by the work contactor 64.

In the embodiment illustrated by FIG. 6, a normally upright wall 68 is secured to the support 12 and fixedly engages the outermost ends of the guides 38, 40, the ends of the latter being squared off in contrast to the somewhat pointed ends shown in FIG. 1. A thumb screw 70 protrudes through an opening in the wall 68, and a pair of lock rings 72 is secured to the screw 70 to allow relative rotation of the latter while precluding axial movement thereof. Additionally, the screw 70 is complementally received within a threaded hole 74 which extends inwardly from one end of the bar 44.

OPERATION

In use, the convex radius gauge 10 is placed in a position to straddle the corner of the workpiece 28 such that the inner surfaces 18, 20 of the stops 14, 16 respectively are in exclusive, face-to-face engagement with a portion of the flat surfaces 32, 34 respectively on the workpiece 28.

Although not essential, it is preferable to next determine the approximate radius of the convex surface 30 by utilization of the indicia 26. The radius is obtained by visual reference to a numeral on the indicia 26 which is directly adjacent the point of radius break, the latter being the line wherein the flat surface 32 intersects with the convex surface 30. Next, the bar 44 is shifted such that the end 44a (or other selected marking) of the bar 44 remote from the rod 46 is directly adjacent a corresponding numeral displayed on the second set of indicia 42, thereby locating the longitudinal axis of the rod 46 in a position approximately coinciding with the center of curvature of the convex surface 30. Note that the distance between adjacent index marks on the indicia 42 is equal to the distance between adjacent index marks on the indicia 26 multiplied by the square root of 2.

After the wing screw 41 is tightened to secure the bar 44 in place, the arm 54 is next shifted to a position wherein the work contactor 64 engages the convex surface 30. The wing screw 56 is then tightened to clamp the arm 54 in place, and and the arm 54 together with the dial indicator 62 are pivoted about the longitudinal axis of the rod 46. The needle 66 provides a visual indication of whether the pivotal axis of the work contactor 64 coincides with the center of curvature of the convex surface 30 on the workpiece 28.

If fluctuations of the needle 66 occur as the work contactor 64 traverses the convex section 30, wing screw 41 is loosened and the bar 44 shifted slightly in the appropriate direction, whereupon the arm 54 is also readjusted to provide engagement of the contactor 64 against the workpiece 28. Once the pivotal axis of the contactor 64 coincides with the center of curvature of the convex surface 30, the needle 66 will not fluctuate during pivotal movement of the indicator 62.

While it is entirely possible to next measure the radius of curvature of the surface 30 by determining the distance between the center of the rod 46 and either of the flat surfaces 32, 34, I have found it considerably more convenient to obtain the radius by measuring the distance between the outer surface of the lower portion 48 of the rod 46 and either of the outer surfaces 22, 24 of the stops 14, 16 respectively. As shown in FIG. 4, the sleeve 50 is removed from the rod 46 and a depth micrometer 76 is utilized to obtain the necessary measurement. Such a convenience is afforded by specifying that the thickness of the stops 14, 16 is equivalent to the radius of the lower portion 48 of the rod 46.

Noteworthy is the fact that movement of the bar 44 is restricted by the guides 38, 40 to ensure that the longitudinal axis of the rod 46 invariably intersects the 45° line bisecting the angle between the stops 14, 16. Since the center of curvature of the convex surface 30 also must be along the 45° line when the stops 14, 16 engage the workpiece 28, the center of curvature may thus be found after a minimum number of tentative adjustments of the bar 44.

As a result, the radius gauge of the instant invention is a convenient and economical hand tool which nevertheless is operable to reliably provide a highly accurate determination of the radius. Furthermore, the radius gauge may also be utilized to discover rough spots or other defects in a rounded junction that is being machined.

I claim:

1. An apparatus for determining the radius of a convex surface on a workpiece, said convex surface being a junction between a pair of non-parallel, flat surfaces wherein said convex surface and said flat surfaces are perpendicular to a common plane, said apparatus comprising:

a support;
   stop means connected to said support and engageable with said flat surfaces on said workpiece for aligning the latter relative to said support;
   a member;
   means shiftably mounting said member for selective movement along a line bisecting the angle between said flat surfaces of said workpiece when said stop means is engaged with said flat surfaces;
   a tool having a work contactor; and
   means coupling said tool to said shiftable member,
   said coupling means being operable to pivotally move said work contactor of said tool about an axis parallel to said flat surfaces of said workpiece when said stop means is engaged with said flat surfaces,
   said pivotal axis also being disposed to intersect with said bisecting line,
   said coupling means also having means adjustably fixing the radius of the path swept by said work contactor as the latter is moved about said pivotal axis,
   said tool also having means indicating whether the pivotal axis of the work contactor coincides with the center of curvature of said convex surface on said workpiece,
   whereby said member can be shifted along said line and said work contactor can be moved radially of said pivotal axis until said pivotal axis and said center of curvature coincide,
   whereupon the radius of said convex surface can be determined by measuring the distance orthogonally from either of said flat surfaces on said workpiece to said pivotal axis.

2. The invention of claim 1, said tool having means for indicating whether the radius of said path swept by said work contactor is larger or smaller than the radius of said convex surface.

3. The invention of claim 2, said tool being a dial indicator.

4. The invention of claim 1, said stop means being a pair of stops each having a flat surface disposed for exclusive, face-to-face engagement with a portion of one of said flat surfaces on said workpiece.

5. The invention of claim 4, said flat surfaces of said stops being mutually perpendicular.

6. The invention of claim 4, said member including an upright, cylindrical rod having a longitudinal axis parallel to said flat surfaces of said stops, said coupling means including a sleeve rotatably carried by an upper portion of said rod.

7. The invention of claim 6, each of said stops also having an outer flat surface parallel to said workpiece-engaging flat surface, the distance between said outer surface and said workpiece-engaging surface being equivalent to the radius of a lower portion of said rod, whereby the radius of said convex surface of said workpiece can be determined by measuring the distance between the lower portion of said rod and the outer surface of said stop.

8. The invention of claim 1; and a first set of indicia connected to said stop means; and a second set of indicia associated with said shiftable member and said member mounting means, such that an approximate radius of said convex surface when said workpiece engages said stop means can be visually determined by reference to said first set of indicia at a location directly adjacent the point of radius break of said convex surface, whereupon said second set of indicia may be utilized to fix said shiftable member at position such that said pivotal axis of said work contactor approximately coincides with the center of curvature of said convex surface.

9. The invention of claim 1, and a screw coupled to said support and threadably engaging said member for adjustably shifting the latter.

10. A hand tool for determining the radius of a convex surface on a workpiece, said convex surface being a junction between a pair of non-parallel, flat surfaces wherein said convex surface and said flat surfaces are perpendicular to a common plane, said hand tool comprising:

a support;
    a pair of stops connected to said support and engageable with said flat surfaces on said workpiece for aligning the latter relative to said support as the support is placed on said workpiece; and
    means associated with said support for determining the center of curvature of said convex surface as said stop means engages said workpiece,
    whereby said radius may be determined by measuring the distance orthogonally from said flat surfaces to said center of curvature.

11. The invention of claim 10, said means for determining the center of curvature including, in part, a cylindrical rod having a longitudinal axis parallel to said flat surfaces as said support is placed on said workpiece, said rod being shiftable along a line bisecting said flat surfaces to a position concentric with said center of curvature.

12. The invention of claim 2, said stops having a thickness equivalent to the radius of a portion of said rod, whereby said radius of said convex section may be determined by measuring the distance from said portion of said rod orthogonally to a point on either of said stops including the thickness of the latter when said rod is concentric with said center of curvature.

13. The invention of claim 10, said means for determining the center of curvature including, in part, a dial indicator having a work contactor, and means associated with said dial indicator and said support for movement of said work contactor along an arcuate path of equal radius to the radius of said convex surface.

14. The method of determining the radius of a convex surface on a workpiece, said convex surface being a junction between a pair of non-parallel, flat surfaces wherein said convex surface and said flat surfaces are perpendicular to a common plane, said method comprising the steps of:
- engaging said flat surfaces of said workpiece in face-to-face contact with stop means connected to a support;
- pivoting a work contactor of a tool about an axis parallel with said convex surface, said tool being coupled to a member shiftably mounted on said support;
- positioning said tool relative to said support at a location wherein the pivotal axis of said work contactor coincides with the center of curvature of said convex surface; and
- determining the radius of said convex surface by measuring the distance orthogonally from one of said flat surfaces on said workpiece to said pivotal axis.

* * * * *